Feb. 28, 1933. G. S. DAUPHINEE 1,899,018
FILTER
Filed April 18, 1927 3 Sheets-Sheet 1
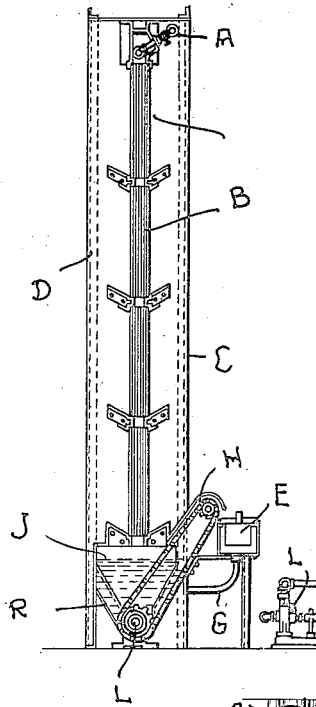
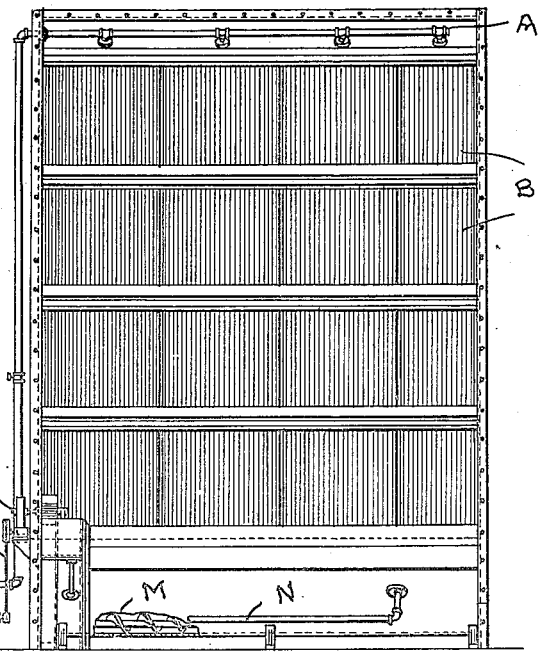
Inventor,
GEORGE S. DAUPHINEE
By Ivan P. Tashof
Attorney Feb. 28, 1933.  G. S. DAUPHINEE  1,899,018
FILTER
Filed April 18, 1927   3 Sheets-Sheet 2
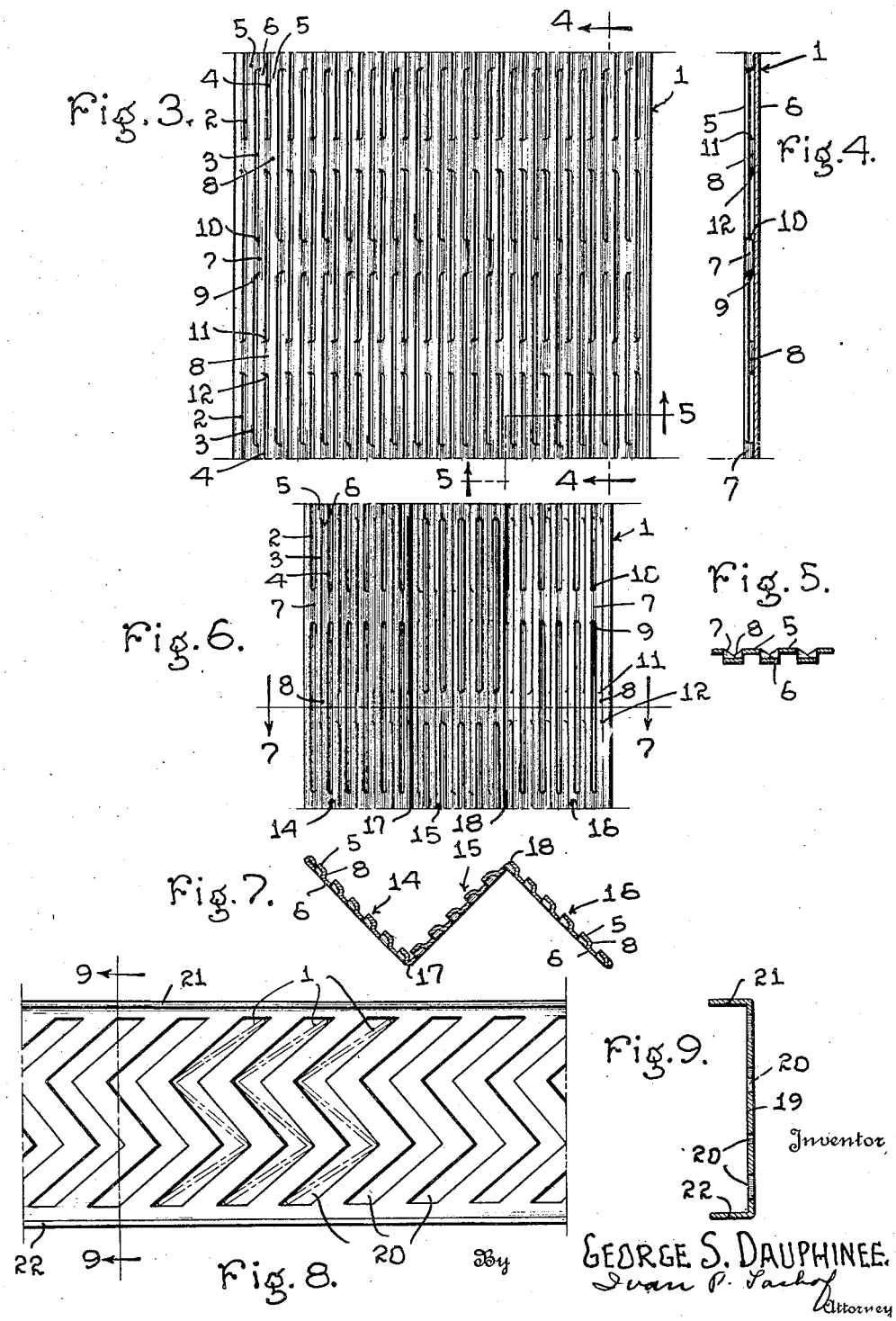

Feb. 28, 1933.  G. S. DAUPHINEE  1,899,018
FILTER
Filed April 18, 1927  3 Sheets-Sheet 3

Inventor,
GEORGE S. DAUPHINEE
By Ivan P. Tashof,
Attorney

Patented Feb. 28, 1933

1,899,018

UNITED STATES PATENT OFFICE

GEORGE SCOTT DAUPHINEE, OF BROOKLYN, NEW YORK, ASSIGNOR TO AMERICAN AIR FILTER COMPANY, OF LOUISVILLE, KENTUCKY, A CORPORATION OF DELAWARE

FILTER

Application filed April 18, 1927. Serial No. 184,589.

This invention relates to the art of filtering impurities from fluids containing the same. More especially, it relates to improvements in the filtering media of air filters of the viscous film type and particularly to filters having media in the form of vertical baffle elements or plates which divide the air into thin flat streams, the plates being bent so as to cause the air stream to travel in a zig-zag course from entrance to exit, thereby causing the dust particles to be thrown against and to adhere to the viscous coated baffle surface. With this type of filter, after the day's run, oil is pumped to the top of the filter and caused to flow over the surfaces of the vertical baffle plates from top to bottom end. This flushes or washes off the day's accumulation of dust or dirt and leaves the baffle surfaces clean and reoiled for the next day's run.

As the majority of ventilating systems are shut down for a portion of the twenty-four hour day, it has been found most convenient and desirable to flush the filter surfaces during this non-operative period, and it is preferably done immediately after the ventilating fans are stopped so that the baffle surfaces will have sufficient time to drain off the excess oil before the fan is started again, as otherwise such excess oil would tend to blow off the filter surfaces and be carried along with the ventilating air.

This type of filter has come to be known as the self-cleaning type and in this respect has a very decided advantage over the type which requires manual attention.

In filters of the self-cleaning type it has been customary to employ smooth baffle members. Baffle members of this character do not satisfy the requirements in a practical way, being defective for the following reasons:

1. The sheet from which the baffle plate is made being smooth drains too completely after flushing so that the oil film left on the smooth surface of the sheet is not sufficient to maintain uniform efficiency over the operating period of the fan. The usual run of the fan is ten to twelve hours but after six or eight hours' operation, the amount of dust accumulated on the baffle surfaces has absorbed the oil film to such an extent that the subsequent dust is being blown over a relatively dry surface and the filtering efficiency is thereby greatly reduced.

2. The smooth plate construction makes it quite difficult or almost impossible to maintain a uniform flow of oil over such baffle surfaces even though the oil be uniformly distributed at the top of the sheet. The oil will quickly form in streams leaving a large portion of the surface, especially at the lower portion of the plate untouched, hence the flushing or washing is very imperfect.

3. With smooth plate construction a relatively large surface with a great number of corrugations or bends must be used to get satisfactory cleaning efficiency. This, in turn, greatly increases the resistance to air flow which for practical operation is distinctly objectionable. The low relative cleaning efficiency is due to the fact that along a large portion of the baffle surface a high velocity air film is moving parallel to it preventing the dust particles having small momentum from penetrating this film for final impingement on the viscous surface. It will be understood that such filters work on the impingement principle, the bends in the baffle plate causing the air to make abrupt turns and that the dust particle, to which has been imparted velocity and due to its weight also momentum, tends to travel in a straight line until it hits the surface of the baffle plate to which it adheres. If the high velocity film, as above referred to, is sufficient to deflect the dust particle on its way to the baffle surface, then it will be carried along in the air current repeatedly and finally passed through the filter. This is the chief reason why smooth baffle plate construction is not an efficient dust remover.

The above facts are set forth as a result of a very careful analysis and observation of the operation of the smooth baffle type of filter. The desire to incorporate in the material used for the baffle plates means whereby the three defects noted would be remedied was the problem which was presented for solution.

The object of the invention is the provision of a baffle material or medium in which none of the defects above mentioned is inherent and which admirably satisfies all the requirements referred to.

An additional object of this invention is to position the ends of the filtering media beyond the working air space, thereby eliminating any possibility of the suspended oil globules from being exposed to the air flow and carried over when the air fan starts to operate.

The invention accordingly consists in the features of construction, combination of elements and arrangement of parts which will be exemplified in the construction hereinafter set forth and the scope of the application of which will be indicated in the following claims.

According to my invention I provide as the filtering element, a slitted and grooved sheet, and I have found that in the production of expanded metal lath, there is produced as an intermediate product, a slitted and grooved sheet which is, broadly, in accordance with my conception of a baffle material fulfilling the requirements set forth. Briefly, it may be stated the slitted formation of my new filtering baffle, or medium, is a decided improvement from the standpoint of defect No. 1; further, the grooves thereof, which in the preferred form are substantially vertical and parallel, substantially eliminate defect No. 2. Additionally, the provision of a baffling medium having combined therein grooves and slits, is a decided improvement from the standpoint of defect No. 3.

Specifically it appears that the following advantages are obtained by the use of my new slitted and grooved sheet.

At the end of each tiny slit a film or small portion of oil is retained to act as storage to be drawn by capillary attraction to the dust accumulation on the plate thereby insuring uniform cleaning efficiency over a relatively long period.

The flushing oil, due to the parallel grooves, flows uniformly over the entire surface and the slitted formation greatly aids in the maintaining of this uniformity from the fact that the film on one side of the sheet is in contact at numerous points with the film on the opposite side of the sheet. The high velocity air film as mentioned in defect No. 3 is destroyed by the slitted formation as a portion of the film passes directly through the plate, and this air, in passing through the plate, is subjected to a multiple baffle action thereby greatly increasing the efficiency of the baffle surface.

In order that my invention may be clearly understood, reference is made to the drawings, where:

Figure 1 is an end elevation of a complete unit type filter embodying the new filtering baffle or media, the view being more or less diagrammatic;

Fig. 2 is a front elevation thereof;

Fig. 3 is an elevation of one side of the slitted and slotted filtering baffle;

Fig. 4 is a section view on line 4—4 of Fig. 3;

Fig. 5 is a fragmentary sectional view on line 5—5 of Fig. 3;

Fig. 6 is an elevation of the slitted and slotted filtering baffle, bent to a particular conformation;

Fig. 7 is a sectional view on the line 7—7 of Fig. 6;

Fig. 8 is a plan view of a baffle spacing element showing several of the filter plates or baffles positioned therein in dotted lines;

Fig. 9 is a transverse sectional view on the line 9—9 of Fig. 8;

Fig. 10 is an elevation of the reverse side of the slitted and slotted filtering baffle shown in Fig. 3;

Figure 11:
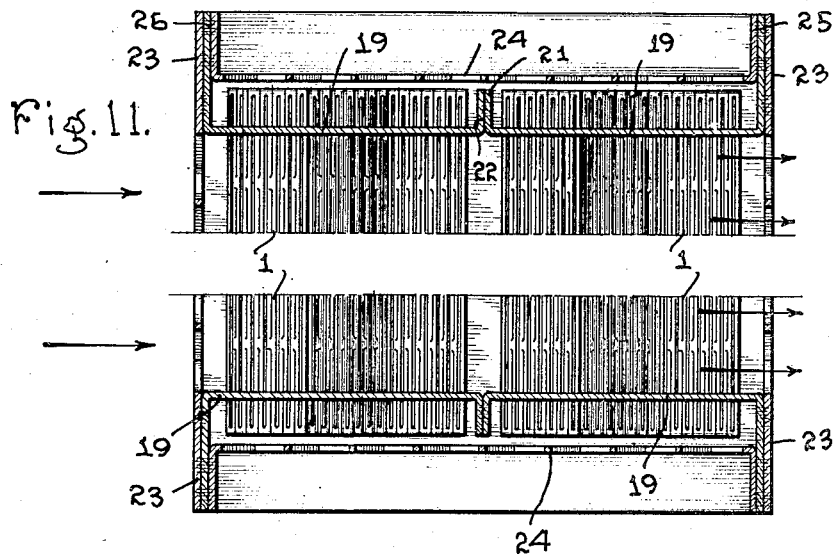
Fig. 11 is an elongated sectional view through the upper and lower portions of a filtering unit showing in assembled relation a baffle spacer which may also act as an oil distributor and filtering plates projecting beyond the vertical flanges of the baffle spacer.

My improved filter plate is adapted to be used as the filter element in the unit filter system illustrated in Figs. 1 and 2. In order to indicate the relationship of the filtering element to the remainder of the system, the system will in general be briefly described, after which a detailed description of the filtering element itself will be given.

The improved filtering plate herein set forth is adapted to be used as the filtering element in the unit filter system illustrated in Figs. 1 and 2. A general description of the elements thereof and the operation is helpful in indicating the function of my new filtering plates.

The complete filter system comprises a primary oil distributor A adapted to distribute oil over filter sections B comprising a series of baffle elements or plates adapted to divide the air into thin flat streams, the plates being of such a character as to cause the air stream to travel in a zig-zag course from entrance to exit and simultaneously allow a portion of the air to pass through the filter plates. In its preferred form, the entire filter media consists of vertical overlapping baffle elements of finely slitted and grooved sheets. In practice it has been found satisfactory to have the filter section including supports about twenty-one and one-half inches high and twenty-four inches wide, giving a capacity of fifteen hundred cubic feet of air per minute. The front flashing C of the filter unit is removable. The rear flashing D functions as a combined flashing and filter support.

The system is provided with an oil reservoir R having an oil level J. The oil is circulated from the oil reservoir R to the primary oil distributor A thereby flooding the entire filter surface. In actual practice it has been found satisfactory to remove the day's accumulation of dust by operating the filter flush pump L for about five minutes. The system is provided with a combined mud ejector and mud conveyor drive H to carry the accumulation of mud to the mud basket E, the latter being emptied when necessary by the drain G. The mud conveyor and mud ejector mechanism is provided with a reduction gear F. The mud conveyor M is operated during the operation of the flush pump L and slowly conveys the sediment to the mud ejector chamber. N represents, diagrammatically, the pump suction from the reservoir R. The system is provided with an automatic starter for operating the motor O. For ventilating systems that are shut down over night, the motor starter switch is arranged so that the filter flush pump L will start automatically when the ventilating fan is shut down and operate for a short period of time to flood the filter surfaces with a viscous film. This period of time may vary but in actual practice five minutes has been found satisfactory.

The baffle plate 1 which comprises one of the filtering elements of the above described system may be made of zinc, galvanized iron or any other easily cuttable and stampable metal or alloy or any synthetic material which is suitable. It is provided with a number of staggered slits having elongated and closed disposed side edges which for the purpose of illustration are shown enlarged to about four times their actual size. These slits are arranged in rows extending transversely of the plate. Also, the plate is provided with other slits likewise arranged in rows transversely of the plate, the last mentioned slits being disposed alternately with the first slits across the plate and the last mentioned rows being staggered longitudinally of the plate with respect to the first rows. Referring to Fig. 3, the slits 2 and 4 are staggered by the slits 3. As shown in the drawings, the plate 1 is also deformed along edges of the slits to form alternate levels of material, thus presenting spaced protuberant portions, as viewed from one side of the plate and spaced grooved or reentrant portions as viewed from the opposite side of the plate. For example, the metal between slit 2 and slit 3 forms a high level or protuberance 5 and the metal between the slits 3 and 4 forms a low level 6 comprising a groove lying between high levels. Thus, the material between adjacent slits of any row, such as the slits 2 and 4, is disposed so that an edge of one of said slits forms part of a low level while an edge of the other of said slits forms part of a different or high level portion.

The high level 5 and the low level 6 are joined by inclined angularly disposed crimped or flattened portions of material forming flanges 7 and 8 lying between respective slits acute angles being formed at the ends of the slits. These angularly disposed portions of material or flanges 7 and 8 incline from the high levels 5 as shown in Figs. 3 and 5 and are partially bounded by the inclined lines 9, 10, 11 and 12 substantially simulating small arcs. It is to be noted that the lines 9 and 10 at the ends of the slits 3 point in one direction and that lines 11 and 12 at the ends of slits 4 point in a substantially opposite direction whereby the angularly disposed portions 7 incline in one direction and the portions 8 in the other direction. The parallel alined angularly disposed portions 7 and 8, as stated, connect the high levels 5 and the low levels 6, merging into the low levels at an appreciable distance from the slits defining the low levels as indicated for portions 7 clearly in Figs. 5 and 3. From the inclination of the portion 8, it follows that it merges into the bottom level 6 at an appreciable distance from the slits defining the same. The angularly disposed crimped portions 7 and 8 form at the ends of each slit acute angles which function as a storage reservoir for oil to be drawn by capillary attraction to the dust accumulation on the plate 1.

As indicated in Fig. 10, the positions of the high levels 5 and the low levels 6 are reversed on the reverse side of the plate 1. For example, the level 5 which is the high level on the front side, becomes the low level on the reverse side. Thus oil reservoirs are formed at the ends of each slit, these reservoirs running in lines extending transversely of the plate.

Figure 12:
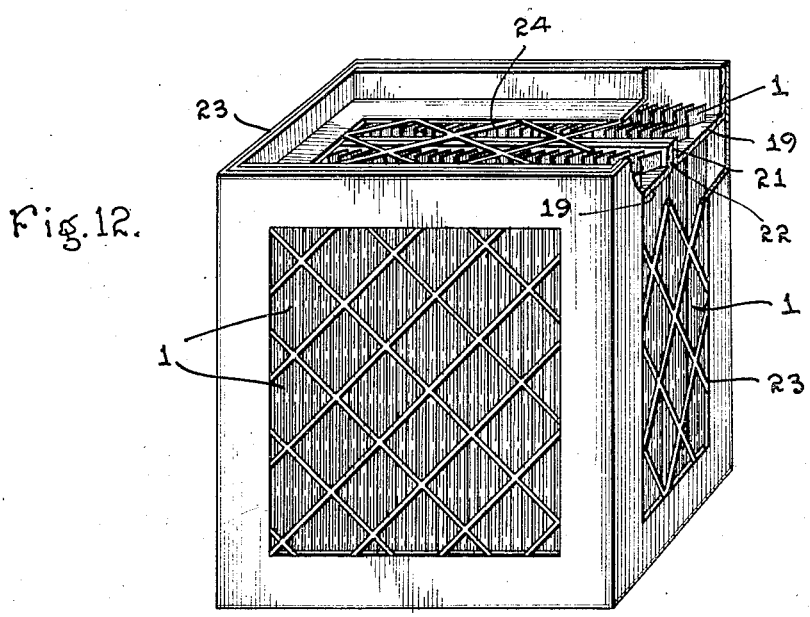
Fig. 12 is a view of one of the filter units detached.

The plates 1 are adapted to be bent at any convenient angle, as shown in Figs. 6, 7 and 12 to form adjacent surfaces 14, 15 and 16 intersecting in lines 17 and 18 and in the preferred form of my invention, the plates overlap. The plates are inserted in a baffle spacer 19 provided with slits 20. The baffle spacer 19 is made of sheet iron or any other suitable metal and is provided with flanges 21 and 22 which form cover plates limiting the effective working filter space.

As shown in Figs. 11 and 12, the bent plates 1 are assembled in a unit, the plates being inserted in baffle spacers 19 which are secured to the outside plates 23 of the filter frame. The unit is provided with a cover 24 of expanded metal which is preferably spot-welded to the flanges of the baffle spacers 19 as indicated at 25 and 26. The baffle spacers 19 may act as oil distributors.

As indicated in Fig. 11, the air passes into the filter frame in the direction of the arrow. The extreme upper portion of the plates 1 are positioned beyond the web of the flange 19, and behind the flange 21. The lower portion of the flange 21, defines the end of the top-most portion of the effective working face. The bottom portion of the filter unit is constructed in substantially the same manner as the top portion whereby the extreme lower portion of the bent plates 1 are positioned beyond the web of the flange 19 and behind the flange 21. This construction constituting means whereby the ends of the bent eliminator plates 1 project and are positioned beyond the effective working face is especially advantageous as it substantially eliminates any chance of suspended oil globules being exposed to the air flow to be carried over when the air fan starts to operate.

Various kinds of viscous liquids may be used. It is preferred that the viscous liquid should be of relatively low viscosity. Lubricating oil having a suitable viscosity is readily attainable.

While it has been indicated that a metal or metal alloy is the preferred material for my bent eliminator plates, it is my broad conception to use any suitable material which may include non-metal synthetic compositions.

It is desired to point out that broadly my conception of a suitable filtering element embraces a slitted and grooved material, allowing a portion of the air in contact therewith to pass therethrough. This is the fundamental basis of my improved filtering member. In accordance therewith, it is desired that my invention be broadly construed. In the more specific form of my invention, I contemplate the use of a slitted and grooved material forming the intermediate product in the manufacture of expanded metal. It is, of course, obvious that my filtering member embraces, broadly, a slitted and grooved material and specifically, a slitted and grooved material, formed from the intermediate product in the manufacture of expanded metal, both of which may assume various mechanical forms, and my invention is not to be limited to the use of the material in the form of a plate.

In the more specific aspect of my invention I contemplate the assemblage of a plurality of bent thin eliminator plates, the plates being arranged to stand upright and overlap as indicated in Fig. 12, functioning to cause a fluid stream to travel in a zig-zag course in contact therewith and simultaneously allow a portion of the air to pass through the plates.

I claim:

1. A filter unit for fluids having as one of its filtering media a member adapted to have its front and rear surfaces covered with a viscous film to retain the impurities present in the fluid being treated, and to be periodically cleaned by flushing with viscous material, said member having its working surface provided with a series of relatively closely spaced fine slits having elongated closely disposed side edges, and alternate levels of material comprising a series of high levels and low levels, the latter constituting grooves, and crimped portions merging into and partially interrupting the continuity of the grooves.

2. A filter unit for fluids having as one of its filtering media a member adapted to have its front and rear surfaces covered with a viscous film to retain the impurities present in the fluid being treated, and to be periodically cleaned by flushing with fresh viscous material, said member having its working surface provided with a series of relatively closely spaced fine slits having elongated closely disposed side edges, adjacent thereto alternate levels of material comprising a series of high levels and low levels, the latter constituting grooves, and with said slits providing reservoir means for the viscous material at the end of the slits and between said high and low levels.

3. A filter unit for fluids having as one of its filtering media a member adapted to have its front and rear surfaces covered with a viscous film to retain the impurities present in the fluid being treated, and to be periodically cleaned by flushing with fresh viscous material, said member having its working surface provided with a series of relatively closely spaced fine slits having elongated closely disposed side edges the corresponding edges of all the slits lying in the same plane and the opposite edges of the several slits lying in a different plane partially defining adjacent alternate levels of material comprising a series of high levels and low levels, the latter constituting grooves.

4. A filter unit comprising a filtering member provided with a transversely arranged row of longitudinally extending slits separated by material disposed to present an edge portion of one slit at a different level from that of an edge portion of an adjacent slit.

5. A filter unit comprising a filtering member provided with a transversely arranged row of longitudinally extending slits separated by material disposed to present one longitudinal edge portion of each slit at a different level from that of an opposed longitudinal edge portion thereof.

6. A filter unit comprising a sheet metal plate having a row of elongated perforations, the material at one edge of each perforation being deformed to present an elongated protuberance extending outwardly as viewed from one side of said plate and a similarly shaped depressed groove as viewed from the opposite side of said plate.

7. A filter unit comprising a filtering member provided with a transversely arranged row of longitudinally extending slits separated by material disposed to present an edge portion of one slit at a different level from that of an edge portion of an adjacent slit, said member being bent to position a group of slits presented by one portion thereof in staggered relation to a group of slits presented by another portion thereof.

8. A filter unit comprising a filtering member provided with a transversely arranged row of longitudinally extending slits separated by material disposed to present one longitudinal edge portion of each slit at a different level from that of an opposed longitudinal edge portion thereof, said member being bent to position a group of slits presented by one portion thereof in staggered relation to a group of slits presented by another portion thereof.

In testimony whereof I hereunto affix my signature.

GEORGE SCOTT DAUPHINEE.